E. R. HUMPHREY & W. B. MARTIN.
METALLIC PISTON PACKING.
APPLICATION FILED APR. 20, 1908.
899,303.  Patented Sept. 22, 1908.
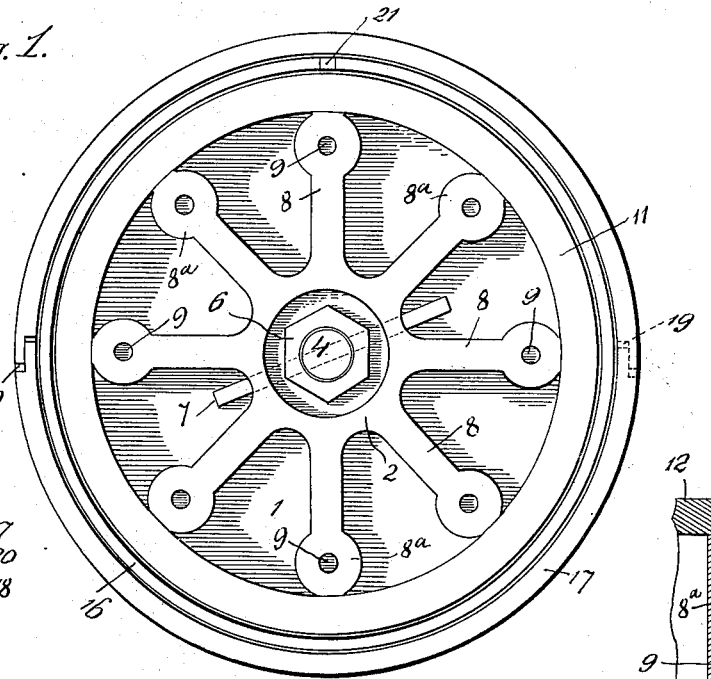
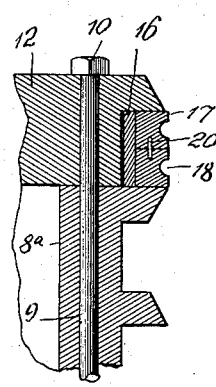
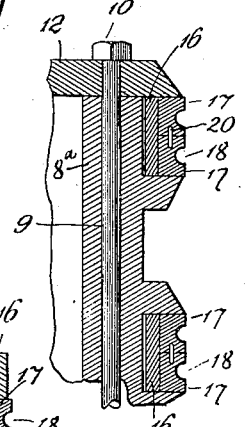
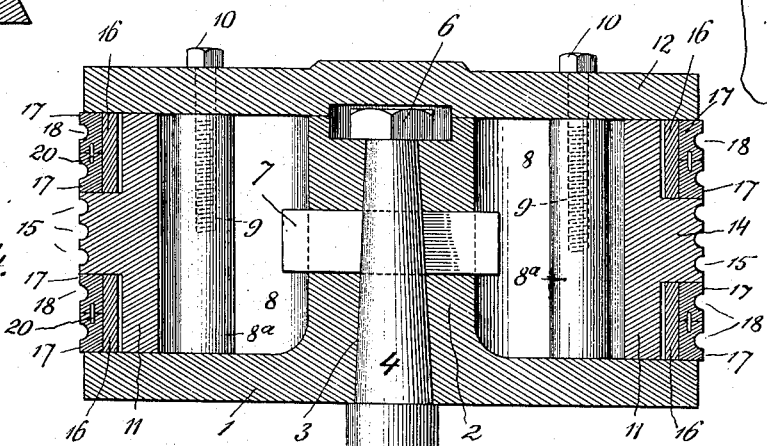
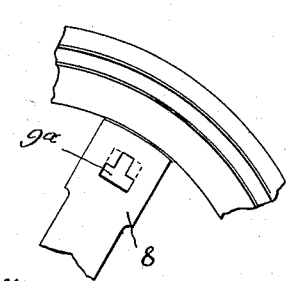
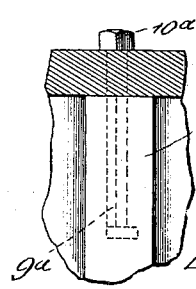
Witnesses
A. H. Rabság,
N. H. Butler
Inventors
E. R. Humphrey and
W. B. Martin,
By H. C. Everth
Attorneys

UNITED STATES PATENT OFFICE.

EMMET R. HUMPHREY, OF PITTSBURG, PENNSYLVANIA, AND WALTER B. MARTIN, OF POINT PLEASANT, WEST VIRGINIA.

METALLIC PISTON-PACKING.

No. 899,303.        Specification of Letters Patent.        Patented Sept. 22, 1908.

Application filed April 20, 1908.   Serial No. 428,064.

*To all whom it may concern:*

Be it known that we, EMMET R. HUMPHREY, residing at Pittsburg, in the county of Allegheny and State of Pennsylvania, and WALTER B. MARTIN, residing at Point Pleasant, in the county of Bland and State of West Virginia, citizens of the United States of America, have invented certain new and useful Improvements in Metallic Piston-Packings, of which the following is a specification, reference being had therein to the accompanying drawing.

This invention relates to metallic piston packings and the invention has for its object to provide a simple and inexpensive metallic packing for preventing leakage of steam within a cylinder, from one side of the piston to the other.

Another object of this invention is to provide metallic packing rings for pistons that can be easily and quickly placed in position and prevented from shifting while the piston is in operation.

With the above and other objects in view, which will more readily appear as the invention is better understood, the same consists in the novel construction combination and arrangement of parts to be hereinafter more fully described and then specifically pointed out in the appended claims.

Referring to the drawing forming part of this specification, like numerals of reference designate corresponding parts throughout the several views, in which;—

Figure 1 is an end view of a piston with the end plate thereof removed. Fig. 2 is a longitudinal sectional view of a portion of a piston illustrating a slight modification. Fig. 3 is a similar view of another modification. Fig. 4 is a longitudinal sectional view of the piston illustrated in Fig. 1, with the end plate in position. Fig. 5 is an end view of a portion of the piston, illustrating a modified form of fastening for the end plate, and Fig. 6 is an elevation partly in section of said modification.

In the accompanying drawing, we have illustrated a head 1 having a hub 2 provided with a tapering bore 3, the latter receiving the tapering end 4 of a piston rod 5. The tapering end 4 is secured within the bore 2 by a nut 6 and by a key 7 arranged transversely of the hub 2. The hub 2 is provided with a plurality of radially disposed arms 8 having enlargements 8ª provided with openings 9 to receive screw bolts 10 employed for retaining an end plate 12 in engagement with the arms 8 and the hub 2.

Surrounding the arms 8 is a bull ring 11 having a central peripheral flange 14 provided with circumferentially arranged grooves 15. Surrounding the bull ring 11 upon each side of said flange 14 are resilient bands 16 serving functionally as springs. Surrounding each band 16 are two metallic packing rings 17, each ring having a circumferentially arranged groove 18 formed therein. The ends of each packing ring are lapped or joined together, as at 19, the joint of one packing ring being diametrically opposite the joint of its associate or adjoining ring, with interposed dowel pins 20 between said rings, to prevent said rings from shifting.

To prevent the resilient band 16 from shifting with relation to the packing rings, we provide said packing rings with inwardly projecting pins 21, adapted to engage between the confronting ends of the band 16.

Referring to Fig. 4 of the drawings, it will be observed that the packing ring 17 and the flange 14 protrude beyond the periphery of the head 1 and the plate 12, and when said piston is mounted in a cylinder, the packing rings 17 form a non-leakable connection between the cylinder and the piston. The grooves 15 and 18 provide peripheral pockets for the reception of steam or a lubricant that might pass between the piston and the cylinder and these pockets containing steam and lubricant are adapted to form a positive steam tight connection between one side of the piston and the opposite side thereof. The pockets containing the lubricant also provide a fluid bearing for our piston. The packing rings and the flange also compensate for the wear of the interior packing surfaces of an engine cylinder and the packing rings, and owing to the novel manner in which the packing rings are mounted upon the piston they can be easily and quickly renewed at any desired time. The novel arrangement of the packing rings reduces friction to a minimum, saves considerable lubricant, and the piston in its entirety is adapted to increase the efficiency of an engine equipped with the same.

In Figs. 2 and 3 of the drawings, we have illustrated our invention in connection with a double headed piston slide valve, while in Figs. 5 and 6 a modified form of fastening means for the plate 12 is shown. The arms 8 are provided with T shaped openings 9ª to receive bolts 10ª.

Such changes in the size, proportion and minor details of our invention as are permissible by the appended claims can be resorted to without departing from the spirit and scope of the invention.

Having now described our invention what we claim as new, is;—

1. The combination with a piston, having a head, a detachable end plate, and a bull ring arranged between said head and said plate and having a peripheral flange provided with circumferential grooves, of resilient bands surrounding said bull ring, metallic packing rings surrounding said bands and arranged in superimposed pairs upon each side of said flange, said rings having jointed ends disposed oppositely to one another, said rings having circumferentially arranged grooves formed therein, dowel pins joining said rings and means carried by said rings for preventing said bands from shifting with relation to said rings.

2. The combination with a piston, having a head, a detachable end plate, and a bull ring arranged between said head and said plate and having a peripheral flange provided with circumferential grooves, of resilient bands surrounding said bull ring, metallic packing rings surrounding said bands and arranged in superimposed pairs upon each side of said flange, said rings having jointed ends disposed oppositely to one another, said rings having circumferentially arranged grooves formed therein, and dowel pins joining said rings.

3. The combination with a piston, of a bull ring mounted thereon, and having a peripheral flange provided on its circumference with annular grooves, resilient bands surrounding said bull-ring, packing rings surrounding said resilient bands and arranged in pairs upon each side of said flange, said rings having annular grooves on their outer circumferences, and means for locking said rings together.

In testimony whereof we affix our signatures in the presence of two witnesses.

EMMET R. HUMPHREY.
WALTER B. MARTIN.

Witnesses to the signature of Emmet R. Humphrey:
MAX H. SROLOVITZ,
A. J. TRIGG.

Witnesses to the signature of Walter B. Martin:
GEO. BEASLEY,
RICHARD X HYSELL.
his mark